Nov. 18, 1924.   1,516,370
F. ZARLENGO
DETACHABLE RIM FOR AUTO TIRES
Filed July 24, 1922
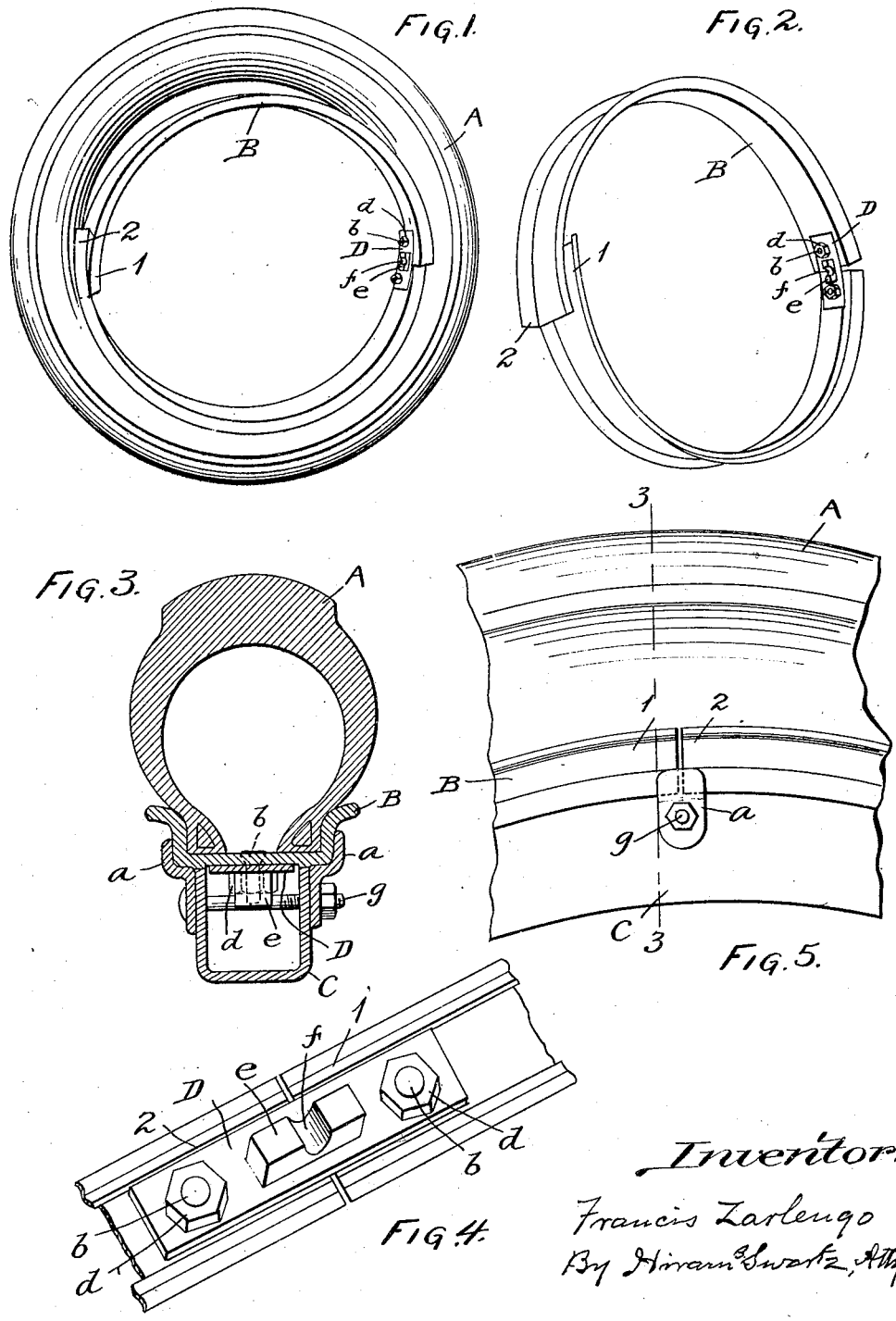
Inventor:
Francis Zarlengo
By Hiram Swartz, Atty.

Patented Nov. 18, 1924.

1,516,370

UNITED STATES PATENT OFFICE.

FRANCIS ZARLENGO, OF WOOSTER, OHIO.

DETACHABLE RIM FOR AUTO TIRES.

Application filed July 24, 1922. Serial No. 577,226.

*To all whom it may concern:*

Be it known that I, FRANCIS ZARLENGO, a citizen of the United States, residing at Wooster, in the county of Wayne and State of Ohio, have invented a new and useful Detachable Rim for Auto Tires, of which the following is a specification.

My invention relates to improvements in rims for supporting the tires of automobiles and the like, and particularly rims which surround the felloes of wheels having rubber tires.

Its principal object is to provide an improved rim for such use, which is easily detachable from the tire, without the use of tools for the purpose as heretofore required.

It consists of the novel construction of a metallic rim in two parts, so united and secured together as to permit the periphery of the rim to be shifted in such manner that the rim may be readily removed from the tire, or mounted therein, as hereinafter fully set forth and stated in the appended claims.

My invention is illustrated by the accompanying drawings, in which similar letters and figures of reference indicate like parts.

Referring thereto, Fig. 1 is a side view of a tire such as commonly used, with my improved rim located therein in contracted form ready for removal bodily therefrom; Fig. 2 is a perspective view of my improved rim, detached, and ready for replacement; Fig. 3 is a cross section of the felloe, tire and rim of an ordinary automobile wheel, on the dotted line 3—3 of Fig. 5, showing the rim supporting means where the rim is cut apart, as hereafter set forth; Fig. 4 is a detail view of a portion of the rim where cut apart, and means for connecting the parts, or loosening them as may be required; and Fig. 5 is a fragmentary elevation of a tire, rim, and felloe near the point where the rim is cut apart.

In the drawings, A is an ordinary rubber tire; B is the metal rim which supports the tire; C is a section of the wheel felloe, which is preferably hollow to admit the rim-connecting means shown in Fig. 4, and $a$, $a$, are clips such as heretofore used, to secure the rim and felloe in position. Heretofore demountable rims have been constructed of one piece split apart where the ends meet; and they have also been constructed with a plurality of sections with a gap or gaps therein filled with removable short sections, and such I do not broadly claim. The former are defective because no provision is made for loosening the rim from the tire except by bending or springing the one end of the circular rim away from the other, which, on account of the flanges on the rim, requires considerable force to disengage the meeting ends from each other and shorten the diameter of the rim sufficient to remove or mount the tire. The latter are objectionable because too complicated and expensive, and also require bending or springing of the longer sections for their removal or mounting, and are without means for adjusting the rim both laterally and longitudinally on the felloe of the wheel, and for securing it from shifting position thereon. The ordinary transversely solid rim is not sufficiently flexible to allow the necessary manipulation, without the use of prying tools, to spring the parts of the rim away from each other and from the tire.

My invention is distinguished therefrom by making the rim in two equal parts adjustably linked together at their cut apart ends, so as to permit said abutting ends to slip past each other in a radial direction, as shown in Fig. 1, by means of a metal strap adjustably secured across the joint, by the loosening of which the said abutting ends are freed from endwise pressure by the one end slipping off and away from the other, and thereby permitting the free ends to also slip past each other, so that one section of the rim drops by gravity to the flexed position shown in Figs. 1 and 2, without the use of tools to disengage them from the tire. Moreover, the coupling strap D facilitates such flexing by means of the bolts $b$, $b$, and the nuts $d$, $d$ being loosened or tightened, as may be required for removing or mounting, as aforesaid. Said strap also holds the two sections of the rim in proper relation to the felloe of the wheel by means of the stud $e$, and the transverse groove $f$ therein, which engages the bolt $g$, and thus holds the clips $a$, $a$ across the joint, as shown in Figs. 3 and 4 and 5, when the rim is mounted within the tire by the means aforesaid. I overcome these defects by cutting the rim apart at a point intermediate the open ends, preferably midway, where the lug $e$ projects within the rim, as shown in Fig. 4, and join the cut apart ends and secure them endwise together by means of a metal strap D laid flatwise across said junction, upon the inner surface of the said ends, and fasten said strap thereon by bolts *d, d*, and nuts *b, b*, and construct the stud *e* upon said strap D so as to be integral therewith, at or near the center thereof, as shown in said Fig. 4, and hollow out the stud, as shown at *f*, to admit the lateral bolt *g* to secure the clips *a* in the usual and well known way. The arrangement of the parts is such that by slightly loosening the nuts *d, d*, the joint between them opens sufficient to permit the opposite ends 1 and 2 to pass each other a considerable distance farther than has been heretofore possible, and thus the loosened rim may be lifted out of the tire without the use of tools, other than a wrench to loosen the nuts aforesaid, and may be replaced within the tire in like manner, and said nuts drawn until the rim attains its usual strength and rigidity. The metal connecting strap D may be lengthened, and additional fastening bolts may be employed to secure the two parts of the rim together, and other modifications may be made within the spirit of my invention, and I do not limit my claims to mere form, but having thus fully described my invention, what I claim as new and desire to secure by Letters Patent is—

1. In a device of the character described, the combination of two equal sections, the ends of which normally abut against each other and are fitted to slip past each other in a radial direction, a metal strap adjustably secured across two of the abutting ends, and secured thereto by bolts, by the loosening of which said abutting ends are permitted to slip past each other in a radial direction, whereby the opposite meeting ends of the rim are disengaged from each other, said strap provided with elongated holes to admit said bolts, substantially as set forth, and for the purpose specified.

2. In a demountable rim, the combination with two equal sections having abutting ends, respectively, said abutting ends fitted to slip past each other in a radial direction, a metal strap adjustably secured across one pair of said meeting ends of the sections, said strap having a hole therethru at each end, loosely fitting bolts adapted to adjustably connect said strap to said rim either loosely or tightly, and a stud projecting inwardly from said strap, and having a transverse groove at its end, substantially as set forth and for the purpose specified.

In witness whereof I hereunto set my hand this 16 day of May, A. D. 1922, in presence of two witnesses—

FRANCIS ZARLENGO.

Witnesses:
HOWARD SWARTZ,
JOHN C. McCLARASE.